United States Patent

Axmann

[11] Patent Number: 5,090,550
[45] Date of Patent: Feb. 25, 1992

[54] BELT CONVEYOR WITH TWO SECTIONS AT A VARIABLE ANGLE

[75] Inventor: Norbert Axmann, Sinsheim-Ho, Fed. Rep. of Germany

[73] Assignee: Firma Axmann-Fördertechnik GmbH, Sinsheim-Steinsfurt, Fed. Rep. of Germany

[21] Appl. No.: 600,409

[22] Filed: Oct. 19, 1990

[30] Foreign Application Priority Data

Oct. 21, 1989 [DE] Fed. Rep. of Germany ....... 3935175

[51] Int. Cl.$^5$ ............................................. B65G 15/26
[52] U.S. Cl. .................................... 198/313; 198/311; 198/861.3
[58] Field of Search .............. 198/311, 313, 318, 536, 198/550.13, 861.2, 861.3, 861.5

[56] References Cited

U.S. PATENT DOCUMENTS

| 448,857 | 3/1891 | Harrison | 198/861.3 |
|---|---|---|---|
| 542,996 | 7/1895 | Dick | 198/861.2 X |
| 809,373 | 1/1906 | Hof et al. | 198/311 |
| 2,577,926 | 12/1951 | Stiles | 198/861.3 X |
| 3,067,858 | 12/1962 | Loosli | 198/313 X |
| 3,134,480 | 5/1964 | Loosli | 198/313 X |
| 3,184,045 | 5/1965 | Fry | 198/318 X |
| 4,350,241 | 9/1982 | Wenzel | 198/311 |

FOREIGN PATENT DOCUMENTS

| 3734560 | 4/1989 | Fed. Rep. of Germany ... | 198/861.3 |
|---|---|---|---|
| 0880149 | 10/1961 | United Kingdom | 198/313 |
| 1146895 | 3/1969 | United Kingdom | 198/313 |
| 2009076 | 6/1979 | United Kingdom | 198/861.3 |

Primary Examiner—Robert P. Olszewski
Assistant Examiner—James R. Bidwell
Attorney, Agent, or Firm—Max Fogiel

[57] ABSTRACT

A belt-type conveyor with two sections at a variable angle to each other and with a continuous belt that travels at each end over at least one deflection roller, at least one of which is driven and at least one of which can be shifted at an angle to its axis of rotation. The sections of belt associated with each conveyor section are accommodated in two channels that are positioned at a variable angle originating at an axis of articulation paralleling the axes of rotation of the deflection rollers and that have walls at each side of the belt extending above its upper strand, and is deflected around guide rollers in the vicinity of the axis of articulation between the conveyor sections. The axis of articulation between the adjustable-angle channels is on the side facing away from the level of the lower strand of the belt and away from the level of the upper strand. The walls of the two adjacent channels overlap throughout the range of angles between the two conveyor section. The axis of at least one deflection roller rests resiliently along the belt on structures that have at least approximately the same resilience over the whole range of angles between the conveyor sections.

4 Claims, 4 Drawing Sheets

BELT CONVEYOR WITH TWO SECTIONS AT A VARIABLE ANGLE

BACKGROUND OF THE INVENTION

The invention concerns a belt conveyor with two sections at a variable angle to each other and with a continuous belt that travels at each end over at least one deflection roller, at least one of which is driven and at least one of which can be shifted at an angle to its axis of rotation, whereby the sections of belt associated with each conveyor section are accommodated in two channels that are positioned at a variable angle originating at an axis of articulation paralleling the axes of rotation of the deflection rollers and that have walls at each side of the belt extending above its upper strand, and is deflected around guide rollers in the vicinity of the axis of articulation between the conveyor sections.

Belt conveyors of this type, which are also often called angled conveyors, are generally known and considered outstanding for their adaptability to different conditions. A section that usually extends horizontally can be followed by a section that can be raised at any requisite angle.

Characteristic of this type of conveyor, which is in particular employed for taking away small parts deriving from production machines, is a continuous belt that is inflected and travels over special guide rollers at the point of articulation between its two sections. The angle between the two conveyor sections can usually be varied from 180° to 135°. Embodiments are also known, however, wherein the angle of the upstream conveyor section to that of the downstream conveyor section can exceed 180°.

The axis of articulation between the two conveyor sections in a known angled conveyor described in a brochure issued by the applicant and already being widely distributed is situated halfway between the upper and lower strand of the belt. The advantage of this location for the axis is that, when one conveyor section pivots in relation to the other, the length of the belt, which extends all the way through and travels over deflection rollers at each end, does not change. Once it has been established, accordingly, the tension on the belt remains constant, even when the angle between the two sections changes. In the vicinity of the pivoting action between the two conveyor sections, the belt travels over special guide rollers, that only extend over the edges of the upper strand of the belt.

What is unsatisfactory about this type of conveyor, however, is that wedge-shaped gaps occur between the walls that extend along each side of the sections of belt that constitute the two conveyor sections and above the upper strand of the belt when the angle between the conveyor sections exceeds a prescribed width while the position of the section is being established. The drawback is particularly serious when small parts are being conveyed because they can drop through the gaps and cause malfunctions.

SUMMARY OF THE INVENTION

The object of the invention is to correct this deficiency and provide an improved belt conveyor with no wedge-shaped gaps occurring in the vicinity of the articulation between the walls that extend beyond the upper strand when the angle between the conveyor sections exceeds a prescribed width.

This object is attained by providing that the axis of articulation between the adjustable-angle channels is on the side facing away from the level of the lower strand of the belt and away from the level of the upper strand, in that the walls of the two adjacent channels overlap throughout the range of angles between the two conveyor sections, and in that the axis of at least one deflection roller rests resiliently along the belt on structures that have at least approximately the same resilience over the whole range of angles between the conveyor sections.

Positioning the axis of articulation between the two conveyor sections in accordance with the invention makes it possible to design and overlap the walls of the channels that accommodate their associated belt sections in such a way as to eliminate all undesirable wedge-shaped gaps between them over the whole range of angles between the two conveyor sections, preventing small parts from getting into the gaps and causing malfunctions.

The changes in length that occur in relation to the position of the axis of articulation when the angle between the two conveyor sections changes are automatically compensated in accordance with the invention in a simple way in that one of the deflection rollers that the belt travels around can be shifted along the belt and is resiliently supported at each end along its axis such that the resilience that provides the support remains at least approximately the same over the total range of adjustment in question. Independently of the angles between the conveyor sections, accordingly, the tension on the belt will remain essentially constant once it has been adjusted. Constant tension, then, is of essential significance in reducing wear on the belt.

The contiguous walls of the channels that are articulated together at an adjustable angle and associated with the two conveyor sections in one practical embodiment of the invention are articulated together at articulations that constitute the axis of articulation.

The structures that resiliently support the axis of the deflection roller that can be shifted along the belt in another advantageous embodiment are pneumatic springs with an especially weak characteristic that engage the axis at each end. This is a simple and cost-effective design that ensures not only the desirable compensation in length in accordance with the particular angle between the conveyor section but also an extensively constant belt tension.

BRIEF DESCRIPTION OF THE DRAWINGS

One embodiment of the invention will now be specified with reference to the accompanying drawing, wherein.

DESCRIPTION OF THE PREFERRED EMBODIMENTS

Figure 1:
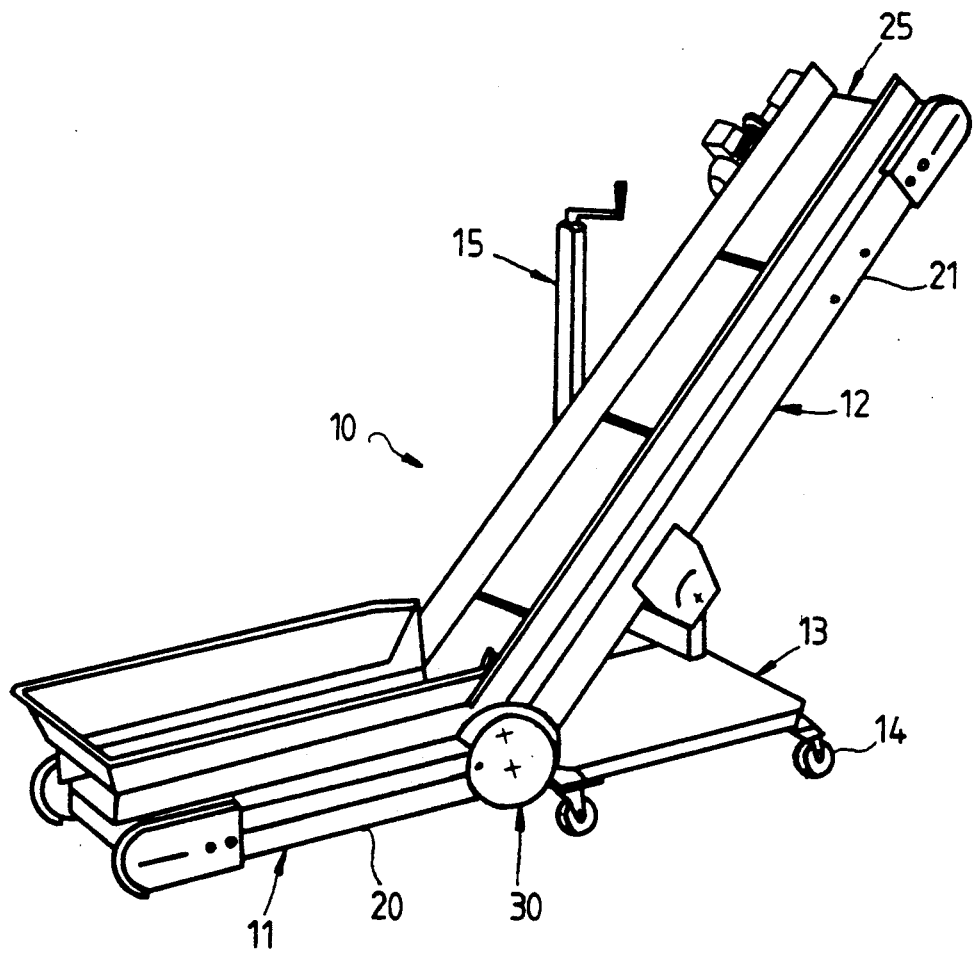
FIG. 1 is a perspective view of an angled belt conveyor with two conveyor sections at an adjustable angle to each other.

The belt conveyor 10 illustrated in the drawings is a mobile piece of equipment with two conveyor sections 11 and 12 at an adjustable angle to each other. It can be raised and lowered on a base 13 that has casters 14 on the bottom. One of the two conveyor sections pivots in a way that is not of interest at this instant on an upright 15 on base 13. The angle between sections 11 and 12 can be adjusted in a way that will be specified later herein.

Figure 3:
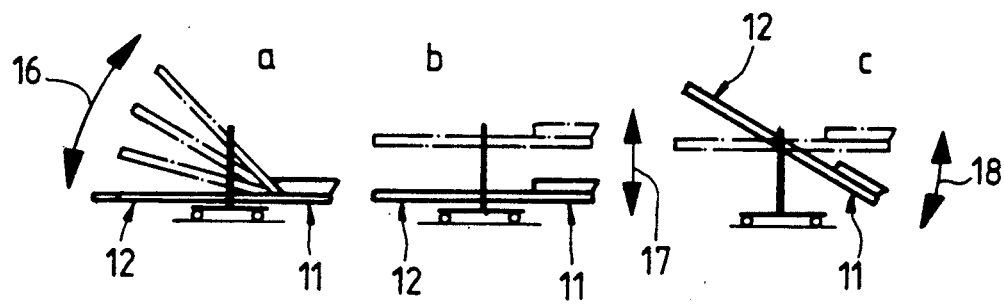
FIG. 3 illustrates the conveyor in various positions.

Various possibilities for adjusting the angle of conveyor sections 11 and 12 to each other and adjust their height are illustrated in FIG. 3. The continuous lines in FIG. 3a represent a situation in which both sections are extended and at their lowermost position. The dot-and-dash lines represent certain angles of one section in relation to the other, which is illustrated as left horizontal. The adjustability of the angle between the two conveyor section is represented by double-headed arrow 16. The continuous lines in FIG. 3b represent the conveyor with conveyor sections 11 and 12 extended and at their lowest level. The dot-and-dash lines show them extended and at the uppermost level. Double-headed arrow 17 indicates how they can be raised and lowered. The dot-and-dash lines in FIG. 3c illustrate conveyor sections 11 and 12 extended and at their uppermost level and the continuous lines illustrate them extended and tilted. The rotation around a pivot in the upright 15 on base 13 is indicated by double-headed arrow 18.

Each conveyor section 11 and 12 comprises a channel 20 and 21 accommodating a continuous conveyor belt 25 that travels around deflection rollers 37 and 38. Each section of belt is associated with a section of conveyor. The channels have walls 26 & 26' and 27 & 27' that extend along belt 25 and above the level 28 of its upper strand. In the vicinity of these walls, the two channels are connected together by articulations 30 that constitute an axis 31 of articulation extending parallel to the axes of rotation of the deflection rollers and at a distance above the level of the upper strand of the conveyor belt. Within the range of angles allowed by the aforesaid articulations, the two strands 28 and 29 of belt 25 travel over special guide rollers 33 and 34, as will be especially evident from FIGS. 7 and 8.

Figure 2:
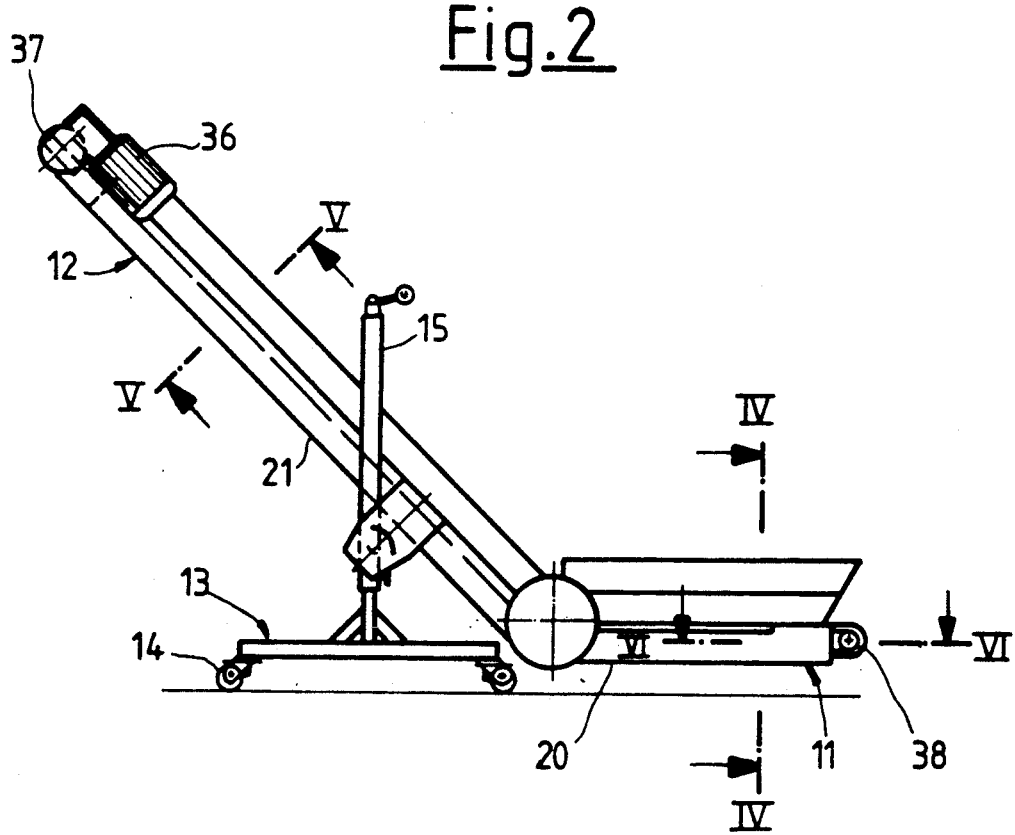
FIG. 2 is a later view of the conveyor in FIG. 1.
Figure 4:
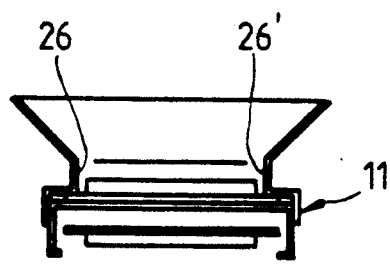
FIG. 4 is a section along the line IV—IV in FIG. 2 through one section of the conveyor.
Figure 5:
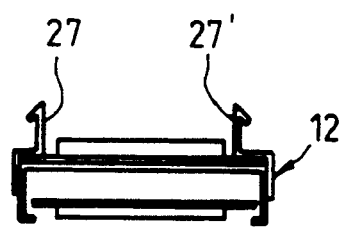
FIG. 5 is a section along the line V—V in FIG. 2 through the other section.
Figure 6:
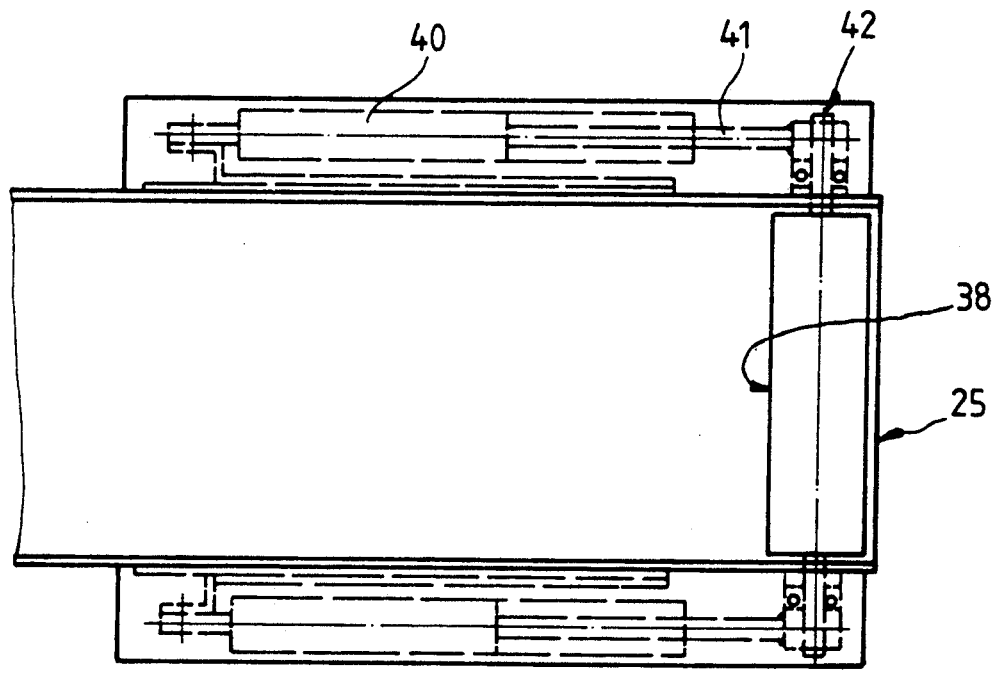
FIG. 6 is a section along the line VI—VI in FIG. 2 illustrating the resilient support provided for a deflection roller by the pneumatic springs engaging each end of its axis.

As will be evident in particular from FIGS. 1 and 2, the conveyor sections 11 and 12 articulated together at the aforesaid articulations differ in length. Longer conveyor section 12 is articulated in a way that is not of particular interest at this instant to the upright 15 on base 13 and has a motor 36 at the end remote from conveyor section 11. The motor drives a deflection roller 37 at the same end. The deflection roller 38 at the end of the other conveyor section is not driven. This roller can be shifted along the conveyor belt and rests resiliently on two pneumatic springs 40 secured to the walls 26 of their associated channel 20. The springs have piston rods 41 that engage journals 42 projecting out of each end of the rollers. The journals engage unillustrated longitudinal slots that allow deflection roller 38 to move parallel with the belt.

Figure 7:
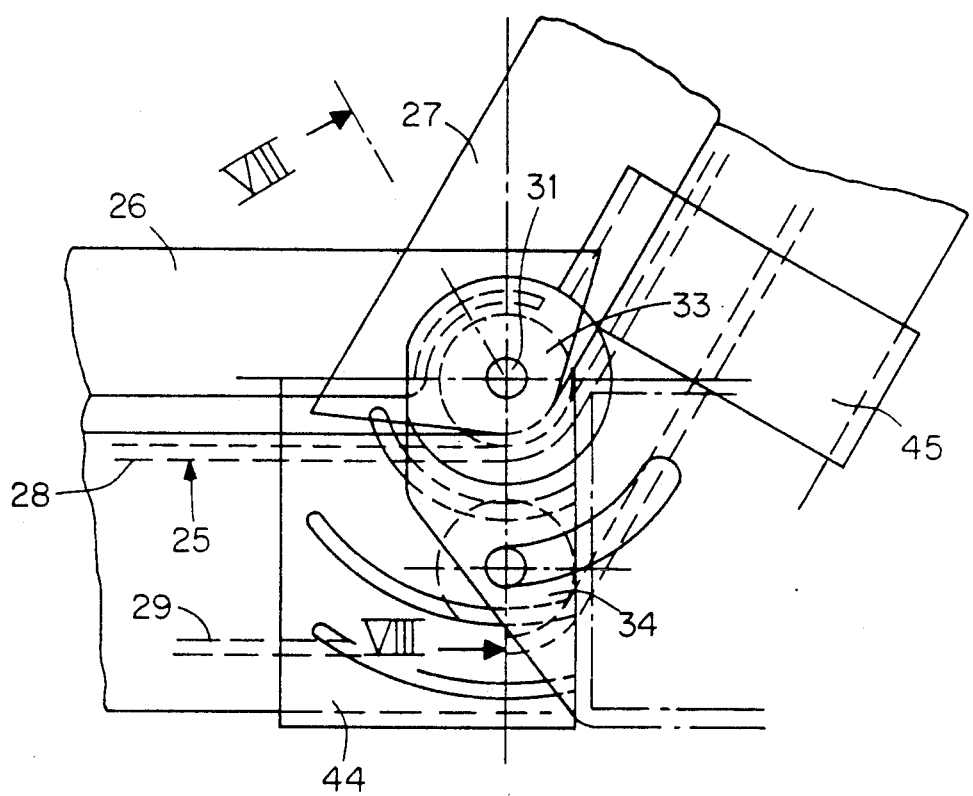
FIG. 7 is a larger-scale side view of one of the articulations between the walls of the channels associated with the two conveyor sections.
Figure 8:
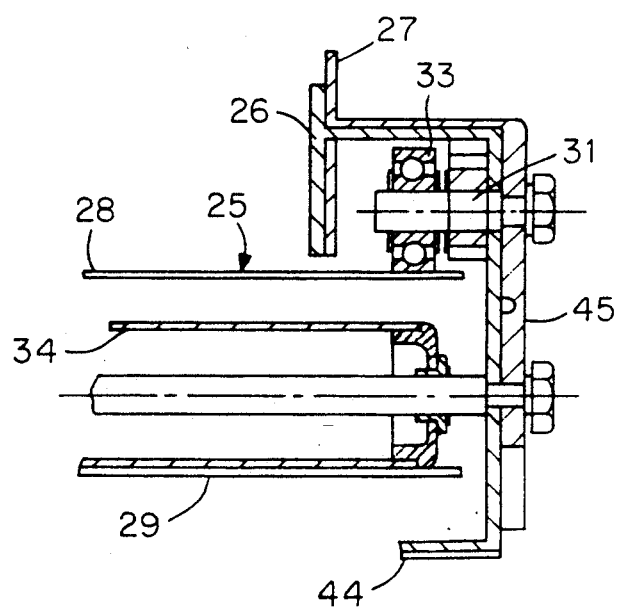
FIG. 8 is a vertical section through the articulation along the line VIII—VIII in FIG. 7.

One of the articulations 30 that connects the walls 26 and 27 of the two conveyor sections 11 and 12 is illustrated in a larger scale in FIGS. 7 and 8. This articulation has two components 44 and 45 that pivot around an axis 31 of articulation and are secured to contiguous walls 26 and 27. Axis 31 of articulation parallels the axes of rotation of the deflection rollers 37 and 38 at the end of belt 25 and is located at some distance above the level 28 of the upper strand of the belt. This situation will be particularly evident from FIGS. 7 and 8.

Rotating on one component 44 of articulation 30 is a guide roller 33 that is in alignment with the axis 31 of articulation between the two conveyor sections. Guide roller 33 engages over the level 28 of the upper strand of belt 25 and accordingly maintains it in the position illustrated in FIG. 7. Rotating on the same component and between strands 28 and 29 is another guide roller 34 that engages the level 29 of the lower strand over its edge and positions it in the vicinity of the pivot. A similar articulation connects the two walls of the channels associated with conveyor sections 11 and 12 at the other side of belt 25.

The components 44 and 45 of the two articulations 30 pivot toward each other from a position with conveyor sections 11 and 12 at an angle of 180° to each other to one in which the two conveyor sections are at an angle of approximately 135° to each other. The latter position is illustrated in FIGS. 1 and 2. The adjustment is continuous over the whole range, and the components can be secured at the desired angle by unillustrated mechanisms.

Given the position of axis 31 of articulation between conveyor sections 11 and 12 at a distance from the level 28 of the upper strand of belt 25, each angular adjustment of one section in relation to the other will lead to a shift along the belt of deflection roller 38, which rests resiliently on the aforesaid pneumatic springs 40 at the end of conveyor section 11. Pneumatic springs 40, which engage the journals 42 accommodated at the ends of the roller in unillustrated slots have extremely flat characteristics and will accordingly extensively exert the same resilient force on the roller even when it is shifted along the belt. This feature ensures that the tension exerted on the belt by the pneumatic springs will remain almost constant independent of the angle between the conveyor sections.

I claim:

1. A belt conveyor comprising: two conveying sections pivotable at variable angles to each other; said conveyor having ends and at least one deflection roller with an axis of rotation at each end; a continuous belt traveling over said deflection roller; means for driving said deflection roller; means for shifting said deflection roller perpendicular to said axis of rotation, a section of said belt being associated with each conveyor section; said two conveying sections having two channels positionable at variable angels relative to each other through a pivoting axis parallel to said axis of rotation of said deflection roller, said belt having sides and an upper strand and a lower strand; said channels having walls at each side of said belt and extending above said upper strand; guide rollers adjacent said pivot axis and between said conveying sections for deflecting said belt; said pivot axis being located above both said lower strand and said upper strand of said belt; said walls of said channels overlapping throughout the range of said angles between said two conveying sections; means for supporting resiliently said axis of rotation of said deflection roller along said belt, said supporting means having substantially the same resilience over said range of angles between said conveying sections, said range of angles being less than 180 degrees, said walls of said conveying sections extending over said upper strand and over said sides of said belt.

2. A belt conveyor as defined in claim 1, wherein said walls of said channels are pivoted together at an adjustable angle are pivoted at pivot means on said pivoting axis.

3. A belt conveyor as defined in claim 1, wherein said supporting means comprises pneumatic springs having a predetermined weak characteristic and engaging said deflection roller at each end thereof.

4. A belt conveyor comprising: two conveying sections pivotable at variable angles to each other; said conveyor having ends and at least one deflection roller with an axis of rotation at each end; a continuous belt traveling over said deflection roller; means for driving said deflection roller; means for shifting said deflection roller perpendicular to said axis of rotation, a section of said belt being associated with each conveyor section; said two conveying sections having two channels positionable at variable angels relative to each other through a pivoting axis parallel to said axis of rotation of said deflection roller, said belt having sides and an upper strand and a lower strand; said channels having walls at each side of said belt and extending above said upper strand; guide rollers adjacent said pivot axis and between said conveying sections for deflecting said belt; said pivot axis being located above both said lower strand and said upper strand of said belt; said walls of said channels overlapping throughout the range of said angles between said two conveying sections; means for supporting resiliently said axis of rotation of said deflection roller along said belt, said supporting means having substantially the same resilience over said range of angles between said conveying sections, said range of angles being less than 180 degrees, said walls of said conveying sections extending over said upper strand and over said sides of said belt; said walls of said channels being pivoted together with pivot means on said pivot axis; said supporting means comprising pneumatic springs having a predetermined weak characteristic and engaging each end of said deflection roller.

* * * * *